US010547564B2

(12) United States Patent
Allrich et al.

(10) Patent No.: US 10,547,564 B2
(45) Date of Patent: *Jan. 28, 2020

(54) SERVICE-BASED LOAD-BALANCING MANAGEMENT OF PROCESSES ON REMOTE HOSTS

(71) Applicant: Microsoft Technology Licensing, LLC, Redmond, WA (US)

(72) Inventors: Brian Allrich, Moorhead, MN (US); Christopher Rudolph, West Fargo, ND (US); Kevin Racer, Osage, MN (US); John Nannenga, Fargo, ND (US); Daryl Anderson, Horace, ND (US); Brett Walker, Argusville, ND (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/022,208

(22) Filed: Jun. 28, 2018

(65) Prior Publication Data
US 2018/0375793 A1    Dec. 27, 2018

Related U.S. Application Data

(63) Continuation of application No. 13/788,946, filed on Mar. 7, 2013, now Pat. No. 10,021,042.

(51) Int. Cl.
*G06F 15/16* (2006.01)
*H04L 12/911* (2013.01)
(Continued)

(52) U.S. Cl.
CPC ............ *H04L 47/822* (2013.01); *G06F 9/505* (2013.01); *H04L 67/1008* (2013.01)

(58) Field of Classification Search
CPC .... G06F 9/505; H04L 47/822; H04L 67/1008
(Continued)

(56) References Cited

U.S. PATENT DOCUMENTS 7,127,717 B2 * 10/2006 Kawashimo ............ H04L 29/06
718/105
7,509,407 B2 * 3/2009 Miller .................... G06Q 10/06
709/223

(Continued)

OTHER PUBLICATIONS

"Third Office Action Issued in Chinese Patent Application No. 201480012719.5", dated Jan. 28, 2019, 7 Pages.

(Continued)

*Primary Examiner* — Moustafa M Meky
*Assistant Examiner* — Thorne E Waugh
(74) *Attorney, Agent, or Firm* — Mannava & Kang, P.C.

(57) ABSTRACT

A session manager is used to manage selection of a remote host for a session in response to a request that is associated with a user. The session manager uses resource information obtained from remote hosts in advance of the request to determine which remote host to associate with a session for a client. Each remote host performs a resource calculation (configurable) to determine how many processes/sessions it can further accommodate. The remote host sends the results of the resource calculation and other determined resource information to the session manager. The session manager provides the determined remote host to a client device. The client device then directly connects to the determined remote host. A process may be automatically started on the remote host for the client as the user. The session manager may also store and receive information for active and historical processes, remote host status, and remote host configuration.

20 Claims, 8 Drawing Sheets

(51) Int. Cl.
  *H04L 29/08* (2006.01)
  *G06F 9/50* (2006.01)
(58) Field of Classification Search
  USPC .................................................. 709/203–248
  See application file for complete search history.

(56) References Cited

U.S. PATENT DOCUMENTS

| | | | | |
|---|---|---|---|---|
| 7,676,576 | B1* | 3/2010 | Kommula | G06F 1/3209 |
| | | | | 709/223 |
| 7,844,713 | B2* | 11/2010 | Ikawa | G06Q 30/00 |
| | | | | 709/217 |
| 8,539,565 | B2* | 9/2013 | Beletski | G06F 9/505 |
| | | | | 709/223 |
| 9,338,227 | B2* | 5/2016 | Aborn | H04L 67/1008 |
| 2002/0073134 | A1* | 6/2002 | Barnett | G06F 9/505 |
| | | | | 718/105 |
| 2004/0267897 | A1* | 12/2004 | Hill | G06F 9/505 |
| | | | | 709/217 |
| 2006/0235974 | A1* | 10/2006 | Ueda | G06F 9/5083 |
| | | | | 709/226 |
| 2009/0234941 | A1* | 9/2009 | Ammerlaan | G06F 9/505 |
| | | | | 709/224 |
| 2009/0276667 | A1* | 11/2009 | Dopson | G06F 9/5027 |
| | | | | 714/48 |
| 2011/0029973 | A1* | 2/2011 | Hara | G06F 3/0607 |
| | | | | 718/1 |
| 2011/0161506 | A1* | 6/2011 | Dickerson | H04L 63/083 |
| | | | | 709/228 |
| 2012/0011240 | A1* | 1/2012 | Hara | G06F 3/0607 |
| | | | | 709/223 |

OTHER PUBLICATIONS

"Second Office Action Issued in Chinese Patent Application No. 201480012719.5", dated Jul. 16, 2018, 6 Pages.

"Fourth Office Action Issued in Chinese Patent Application No. 201480012719.5", dated Aug. 12, 2019, 7 Pages.

* cited by examiner

SERVICE-BASED LOAD-BALANCING MANAGEMENT OF PROCESSES ON REMOTE HOSTS

PRIORITY

This application is a Continuation of commonly assigned and co-pending U.S. patent application Ser. No. 13/788,946, filed Mar. 7, 2013, the disclosure of which is hereby incorporated by reference in its entirety.

BACKGROUND

Load balancing is a method to distribute work across different machines to more efficiently utilize available resources. For example, a machine may be selected to process a request based on current resources being used by that machine. Load balancing processes across servers can be challenging.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A session manager is used to manage selection of a remote host for a session in response to a request that is associated with a user. The session manager uses resource information obtained from remote hosts in advance of the request to determine which remote host to associate with a session for a client. Each remote host determines its currently running processes/sessions and performs a resource calculation to determine how many processes/sessions it can further accommodate. The resource calculation performed by the remote hosts is configurable and may be updated during runtime. After the remote host performs the resource calculation, the remote host sends the results of the resource calculation and other determined resource information to the session manager (e.g. through a secured connection). The session manager uses the provided resource calculation and information from each of the remote hosts to determine which remote host is available to create a new process and/or is already associated with a session. The session manager provides the determined remote host to a client device. The client device then directly connects to the determined remote host. A process may be automatically started on the remote host for the client as the user. The session manager may also store and receive information for active and historical processes, remote host status, and remote host configuration. The calculation performed by each of the remote hosts may be altered at runtime by the session manager which manages the metrics, limits, and algorithm data for each remote host.

DETAILED DESCRIPTION

Figure 1:
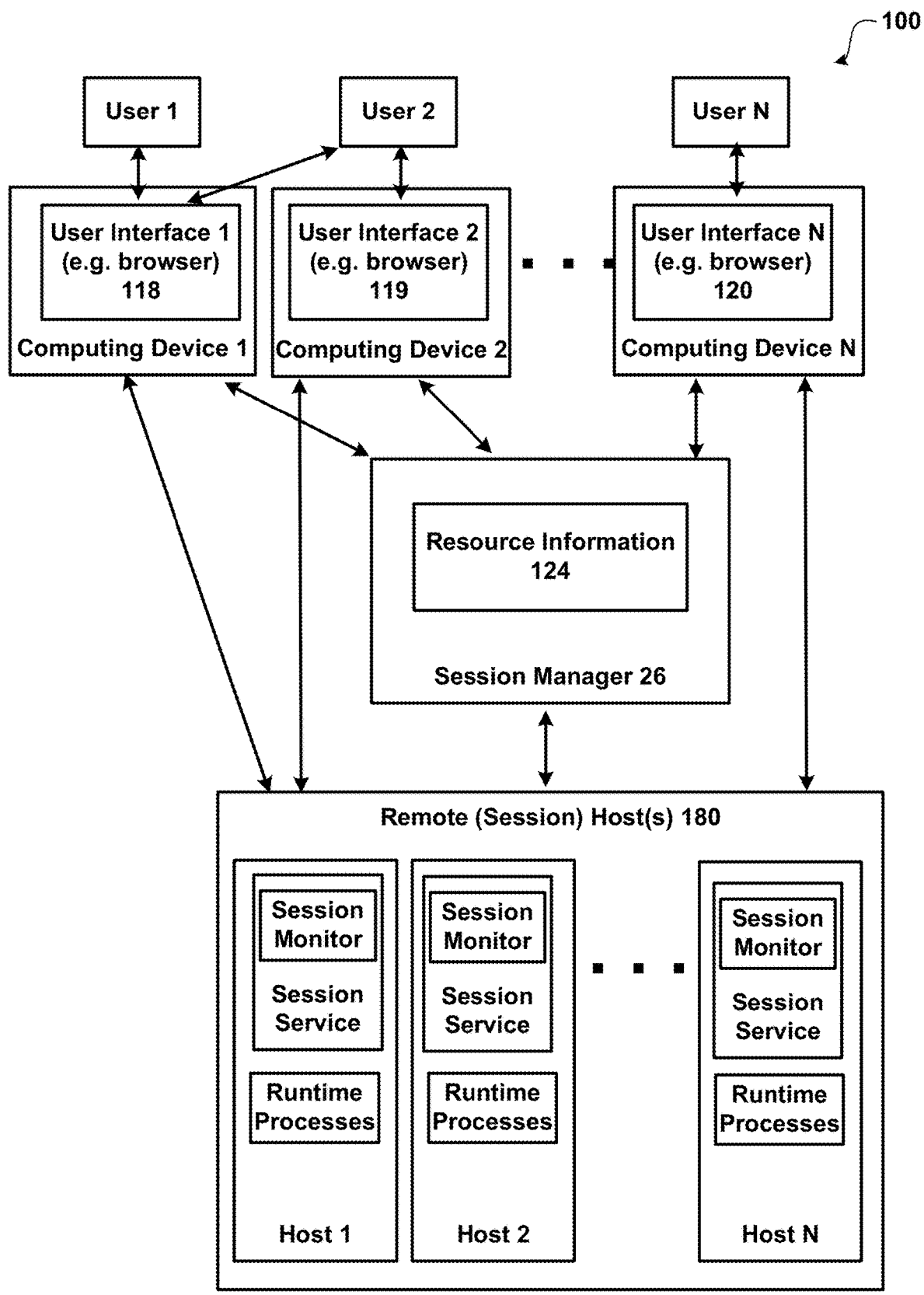
FIG. 1 shows a system for load balancing management of processes on remote hosts.

Referring now to the drawings, in which like numerals represent like elements, various embodiment will be described.

FIG. 1 shows a system for load balancing management of processes on remote hosts. As illustrated, system 100 includes computing devices 1-N, remote hosts 180, session manager 26, user(1) 1-N and User Interfaces (UIs) 1-N (118, 119 and 120).

System 100 as illustrated may comprise zero or more touch screen input device/display that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that are in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezo-electric devices, capacitive sensors, resistive sensors, inductive sensors, laser vibrometers, and LED vibrometers. One or more recording devices may be used to detect speech and/or video/pictures (e.g. MICROSOFT KINECT, microphone(s), and the like). One or more speakers may also be used for audio output (e.g. TTS synthesized speech).

Generally, session manager 26 manages selection of a remote host to create a process/session in response to a request that is associated with a user (e.g. User 1-N). According to an embodiment, the sessions are associated with the MICROSOFT DYNAMICS GP. The sessions, however, may be associated with other types of applications/programs. The session manager 26 stores and uses resource information 124 obtained from remote hosts 180 to determine which remote host to associate with a session for a client. Each remote host 180 (e.g. Host 1, Host 2, . . . Host N) determines its currently running processes/sessions and performs a resource calculation to determine how many processes/sessions it can further accommodate. According to an embodiment, the resource calculation is performed upon the occurrence of an event (e.g. session created/stopped, period of time expired, sudden change in resources being utilized, and the like). Configuration information for determining how a remote host is to perform the resource calculation may be stored with the session manager and/or on each of the remote hosts and/or some other location (e.g. network location). According to an embodiment, the configuration information is stored on the session manager.

After each remote host performs the resource calculation, the remote host sends the resource information to the session manager 26 such as through a secured connection. Session manager 26 stores the resource information 124 received from each of the remote hosts. The resource information 124 includes information indicating a number of sessions that each host may further accommodate (as determined by the remote host). According to an embodiment, the resource information includes each of the active sessions/processes on each remote host along with other resource information (e.g. used/available memory, processor utilization, and the like). In response to a request from a computing device that is associated with a user (e.g. computing device 2 with user 1), session manager 26 determines which remote host is available to create a new process and/or is already associated with a session for the user. The request may include authentication information that is used to authenticate and authorize a user. As illustrated, a computing device may be used by different users (e.g. User 2). The session manager 26 may also store and receive information for active and historical processes, remote host status, and remote host configuration. The calculation performed by each of the remote hosts may be altered at runtime by the session manager which manages the metrics, limits, and algorithm data for each remote host. According to an embodiment, a remote host may be suspended from accepting new sessions but sill servicing existing running sessions. A user may reconnect to those sessions through the session services even though the remote host is currently not accepting new session requests.

Remote host(s) 180 comprise computing devices (e.g. servers) that each contain a session service and runtime processes. In response to receiving a request from a caller (e.g. User 1, User 2, ... User N) from a computing device (e.g. computing device 1 ... N) to start a session, the session service on the remote host creates a session that starts a runtime process. As discussed herein, the computing device receives the selection of the remote host from session manager 26. In other words, instead of the session manager 26 acting as a proxy and making the connection itself between the computing device and remote host, session manager 26 returns a determined remote host to the requesting caller and computing device. According to an embodiment, after receiving the request from the computing device, the session service on the called remote host creates and exposes a runtime service for an application (runtime process) on the remote host for the requesting computing device to securely communicate with the session on the remote host.

A session monitor on each of the remote hosts performs a resource calculation and reports its resource information (e.g. load) to session manager 26 which assists in the determination of which remote host receives requests to create new sessions. The session monitor runs on a configurable interval and/or predetermined events and is configured to inspect the running sessions, perform any cleanup tasks, and report the information to session manager 26.

According to an embodiment, the session monitor is a component of the session service running on the remote host that monitors host resources and perform other actions such as inspect running sessions, perform cleanup tasks, and report the information to session manager 26. Session manager 26 and/or some other service may also be configured to authorize users. A bridge service (not illustrated) may be used to bridge the session service with the runtime process.

According to an embodiment, the session monitor running on the remote host does not have knowledge of past reports of the resource information made to the session manager. According to another embodiment, the session monitor may store resource information. In this example, the session monitory may perform weighted average calculations such that reports made by the session monitor to the session manager include data such as average memory, average processor utilization, and the like.

Session manager 26 queries the resource information 124, such as a Remote Host Status table, and uses a Sessions Able To Create number for a remote host and multiplies the number by a Utilization Rate. Based on the ordered results, Session manager 26 queries a top number of potentially available remote hosts (e.g. 1, 2, 3, ... ) to determine if the remote host is available. According to an embodiment, session manager 26 uses a call of IsAvailable( )to the session service on the remote host. If the host is available, the host returns the information about the host so the application/website can communicate with it. If the host is not available, session manager 26 queries the next host in the ordered list. The IsAvailable operation performs a mini performance check to determine if a session can actually be created based on the data provided from session manager (maximum sessions that can be running, minimum memory to start a session, etc.). According to an embodiment, session manager 26 does not perform a lot of load balancing algorithm work since that is performed by each remote host before the remote host reports their current resource information and resource calculation determined during a session monitor run. According to another embodiment, session manager 26 may perform load balancing calculations such as: querying multiple remote hosts; managing a queue rather than one at a time to enable a faster returned results since each failed query might take a relatively long time (e.g. 25 seconds); use additional information to modify the resource information/calculation returned from the remote hosts; and the like.

According to an embodiment, session manager 26 calls operations on remote host(s) 180 using operation, such as: Is Available, Set Calculation Algorithm, Run Session Monitor, Get/Set Custom Runtime Settings for a Session, Terminate Session to interact with remote hosts 180.

IsAvailable( )—Checks if the session service is available and additionally performs performance checks to determine if the remote host can take on a new session by analyzing memory utilization, processor utilization, network utilization, tenant specific performance metrics, and/or user specific performance metrics.

SetCalculationAlgorithm( )—Updates the algorithm data configuration for the remote host used in the determination for sessions able to create, monitor run frequency, default average memory to user for the runtime process when no running runtime processes, minimum memory available to start a new process, maximum number of sessions that can be running on a remote host, remote host metrics for when a session monitor runs based on performance (processor, memory, disk i/o, network).

RunSessionMonitor( )—Initiates the session service to run its session monitor. When the session manager service starts, it calls this operation on each remote host in the farm.

SetCustomRuntimeSettings(string sessionId, IDictionary<string, string>updatedSettings) —Updates the custom settings used by the runtime process on a remote host for the given session id. Session manager looks up the remote host for the sessionId provided and makes the call to the remote host to retrieve the data.

SetCustomRuntimeSettings(string sessionId, IDictionary<string, string>updatedSettings)—Updates the custom settings used by the runtime process on a remote host for the given session id. Session manager looks up the remote host for the sessionId provided and makes the call to the remote host to retrieve the data.

TerminateSession(string sessionId)—Terminates the running session on the host associated with the provided session id.

Remote host(s) 180 calls operations on session manager 26 using operations such as: Get Calculation Algorithm, Get Service Security Groups, and Report Sessions.

GetCalculationAlgorithm(string remoteHostId)—Gets the algorithm data configuration for the remote host used in the determination for sessions able to create, monitor run frequency, default average memory to user for the runtime process when no running runtime processes, minimum memory available to start a new process, maximum number of sessions that can be running on a remote host, remote host metrics for when a session monitor should run based on performance (processor, memory, disk i/o, network).

GetSessionServiceSecurityGroups(string remoteHostId)—Obtains security groups defined for the session service. The session service calls this operation when it starts to setup the security of its operations for authorizing callers and application users.

ReportSessions(SessionHostStatus sessionHostStatus, IEnumerable<SessionReportingInfo>sessionsToReport)—Allows a remote host to report all of its session information to the session manager. When a session monitor is run it calls this operation to report its sessions and host status.

According to an embodiment, client calls operations on session manager 26 using operations, such as: Get/Set Remote Hosts Configuration, Get/Set a Remote Host Status, Get Available Remote Host, Get Sessions using a number of filtering options (user, remote host, status), Get/Set Custom Runtime Settings for a Session, and Terminate a Session.

GetRemoteHostConfiguration(string remoteHostId)—Gets the configuration information for a remote host.

GetRemoteHostsConfiguration( )—Gets the configuration information for all the remote hosts in the farm.

SetRemoteHostConfiguration(string remoteHostId)—Updates the configuration information for a remote host.

GetRemoteHostStatus(string remoteHostId)—Gets the status of a remote host.

SetRemoteHostStatus(string remoteHostId, status Value)—Updates the status of a remote host.

GetMostAvailableRemoteHost( )—Gets the most available remote host in the farm based on a calculation using a number of load balancing factors. According to an embodiment, session manager 26 queries a Remote Host Status table and take the Sessions Able To Create number for a remote host and multiply it by the Utilization Rate. Based on the ordered results, session manager 26 queries the session service on the remote host to determine if it IsAvailable( ). If the remote host is available it returns the information about the host so the client can communicate with it. If the remote host is not available, it will query the next host in the ordered list. According to an embodiment, session manager 26 is not responsible for doing a lot of load balancing algorithm work since that is the responsibility of each remote host to report their current data during a session monitor run. Session manager 26 load balancing may do additional work like querying 3 remote host machines at a time/managing a queue rather than 1 at a time to enable a faster returned result since each failed query might take 25 seconds.

GetSessions(any number of filtering options for user, remote host, status, etc)—Gets a list of sessions based on the filters provided.

GetCustomRuntimeSettings(string sessionId, IEnumerable<string>keys)—Gets the custom settings used by the runtime process on a remote host for the given session id. Session manager 26 looks up the remote host for the sessionId provided and make the call to the remote host to retrieve the data. If a key is specified for which no value is found, that key is left out of the result set.

SetCustomRuntimeSettings(string sessionId, IDictionary<string, string>updatedSettings)—Updates the custom settings used by the runtime process on a remote host for the given session id. Session manager 26 looks up the remote host for the sessionId provided and makes the call to the remote host to retrieve the data. If a key is provided that is unknown to the runtime process, it is ignored.

TerminateSession(string sessionId)—Terminates the running session on the remote host associated with the provided session id.

According to an embodiment, client calls on remote host 180 include operations such as: Authorize User, Create a Session and Get Session Recovery Information.

Authorize(string user, string password)—Used for authentication and authorizing the user. If the user credentials provided are authenticated the user is authorized by being a member of the users/groups defined for User Accounts. If the user is authorized the user credentials are securely stored on the remote host with an authentication token and used for creating one session. The authentication token is returned to the caller. It is used to validate the call to the CreateSession operation. The Authorize operation is typically not used when the process is started as an impersonated user.

CreateSession(SessionCreationContext sessionInfo, Guid authenticationToken)—Creates a client session as the user assigned to the authentication token. According to an embodiment, the process is started as the user assigned to the authentication token which is stored in memory/secure string during the Authorize operation. When the session is created, the user credential cache stored during the Authorize operation and used by this operation will be removed from the secured memory. When a session is created, report the information to session manager by triggering the session monitor to run.

GetSessionRecoveryInformation(string sessionId)—Obtains information about a session to use for recovering an existing session.

According to an embodiment, there are seven states of a session including Active, Process Running But Not Responsive, Client Initiated Termination, Heartbeat Timeout Termination, Unresponsive Timeout Termination, Administrator Termination, and Unknown Termination. An Active state indicates that the session is running and any shared data may be accessed. A Process Running But Not Responsive indicates that the session process is running but the session monitor was unable to communicate with the session. A Client Initiated Termination indicates that the client initiated the session to be terminated. A Heartbeat Timeout Termination indicates that the client stopped sending a heartbeat and the heartbeat timeout configured value was met so the session monitor terminated the session. An Unresponsive Timeout Termination state indicates that the session is running but shared data could not be accessed. If a session is unresponsive, the associated application cannot connect to it. According to an embodiment, an unresponsive session is not terminated the first time it is encountered during a session monitor run since it might be in the process of being created. According to an embodiment, the second time a session is unresponsive during a monitor run it is force terminated. This has been found to be a rare case. An Administrator Termination state indicates that the session was terminated by an administrator. An Unknown Termination state indicates that the reason for the terminated session is unknown. The session monitor reports running processes and the session manager processes the results. If the session manager determines that a session was previously reported as Active or Process Running But Not Responsive and is now not in the list of sessions running it marks the session as unknown termination.

The following scenarios are for illustration purposes and are not intended to be limiting.

The following scenario describes creating a new session. Initially, a user accesses an application that is used to access a service. According to an embodiment, a user accesses a web page for the service. Alternatively a user may access a different UI to access the service. After accessing the service, authentication information is received from the user. Instead of receiving the authentication information directly from the user, the authentication information that is associated with a user may be received from a stored location.

Using the authentication information associated with the user, a remote host is determined using session manager 26. The authentication information may include different credentials (e.g. username and password) and/or other authorization information (e.g. user is a member of an allowed users group). If authenticated and authorized, the authentication information for the requesting user are securely stored on the remote host (e.g. memory)used when creating a session. An Authentication token may be returned back to the requesting caller and computing device and stored for later use.

Session manager 26 also determines if there are any active sessions currently associated with the user. For example, a user may have started a session on one computing device while at work and then later made a request from a home computer. A user may be associated with one or more tenants. When there are no active sessions and one tenant, a new session using the single tenant is created. When there are active sessions, a display of the active sessions for the user are displayed (e.g. in a grid). When there are two or more tenants associated with the user, the tenants are displayed to the user. When the user selects to create a new session, the authentication token and tenant information is used to create a session on the remote host that authorized the user. The remote host starts the runtime process defined in the tenant information using the user authentication information supplied earlier.

The following scenario describes recovering an existing session that is associated with a user. After authenticating and authorizing the user, a list of active sessions for the user is determined. When there are active session(s) that are associated with the user, the sessions are displayed to the user such that the user may select a session. After receiving a selection, a request to the remote host that is associated with the selected session is used to obtain detailed information for the current session such as the Runtime Service Address and the Security Token. If the session is still active, the information is returned. If the session is not active, null is returned and the calling application (e.g. webpage) handles the error condition by displaying an error message and refreshing the list of sessions. When the session is active, the user is redirected to the active session. According to an embodiment, the user is redirected to a web page. The associated website code creates the initialization parameters based on the selected session and passes them to an associated application (e.g. MICROSOFT SILVERLIGHT). The parameters consist of the data to connect to the runtime service and include a flag to initiate recovery of the session.

Within the web page, the application loads and deciphers the parameters. The application requests a new security token by calling an operation on the runtime service passing in the original security token which invalidates the original security token. The runtime service on the remote host associated with the selected session processes the request and sends information to the application on the client that processes the information and displays the windows and data associated with the session.

According to an embodiment, the remote host used to create (a potentially) new session is determined when the user enters their credentials on the website. According to another embodiment, the determination of the most available remote host will be done only when the user selects to create a new session. A possible benefit is that any adverse change in the remote host between the time the user is authenticated and when they select to create a session is minimized. Additionally, if the user selects to recover an existing session (rather than create a new session) no determination is needed for the most available remote host.

Figure 2:
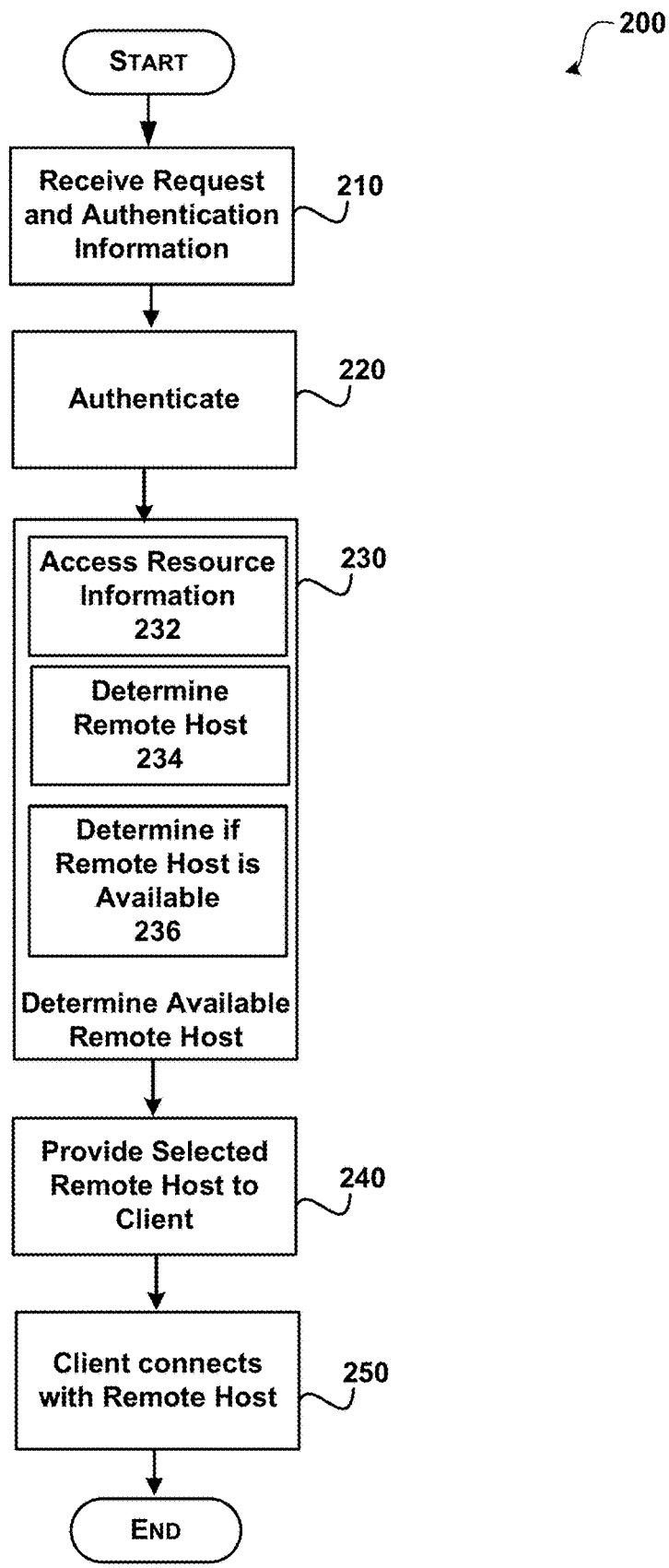
FIG. 2 shows a process for load-balancing sessions on remote hosts using a session manager.
Figure 3:
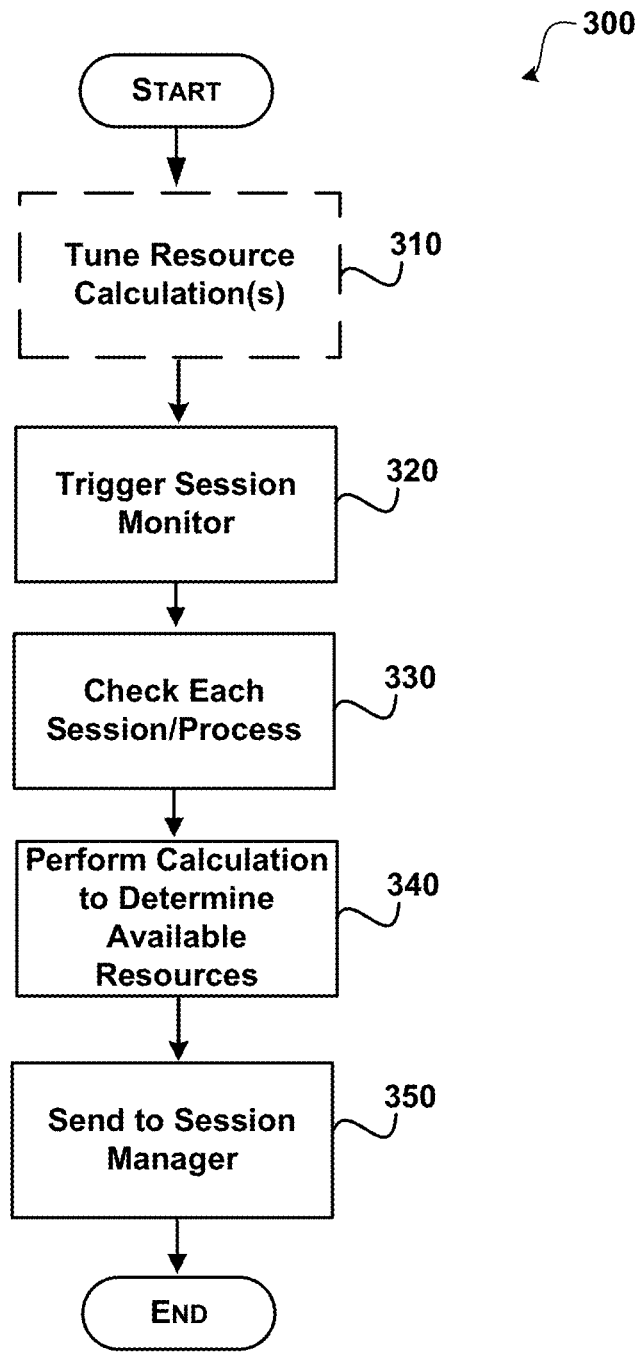
FIG. 3 illustrates a process for monitoring a remote host and providing resource information to a session manager.

FIGS. 2 and 3 shows an illustrative process for load balancing processes on remote servers using a session manager. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 2 shows a process for load-balancing sessions on remote hosts using a session manager.

After a start operation, the process moves to operation 210, where a request and authentication information is received. The request may be a request to start (e.g. create) a new process/session and/or select an existing process/session that is still active. The authentication information uniquely identifies a user and/or tenant(s) that is associated with the user. The authentication information may be received directly from a user (e.g. enter password/identifier(s)) and/or obtained from a memory (e.g. ROM/RAM/hard drive/network store/ . . .). According to an embodiment, the authentication information is received from a client device that is associated with an application/session run on a remote host.

Flowing to operation 220, the user is authenticated and authorized. Different authentication checks may be determined. For example, one user may be authenticated for accessing one service whereas another user may be authenticated for additional services and/or access to other data.

Moving to decision operation 230, an available remote host is determined. According to an embodiment, the remote host is determined by a session manager that is different from remote hosts that are configured to execute a session for the user that is associated with a client computing device.

At operation 232, resource information is accessed by the session manager. The resource information includes resource information and availability for each of the remote hosts that are configured to create/run a process/session that is associated with the request. According to an embodiment, the resource information includes a determination made by each of the remote hosts as to a number of sessions it can further accommodate (e.g. run) along with each of the active sessions/processes on each remote host along with other resource information (e.g. used/available memory, processor utilization, and the like). Each of the remote hosts provides the session manager with resource information based on an event trigger (See FIG. 3 and related discussion).

At operation 234, a remote host to create a session and/or that is already associated with a session to restore is determined. According to an embodiment, the session manager determines a most available remote host by examining the resource information and determining a remote host that has the most availability as compared to the other remote hosts. For example, the remote host that indicates it is available to accommodate more sessions than the other hosts is initially selected. One or more remote hosts may be initially selected (e.g. one, two, three, . . . ).

At operation 236, a determination is made as to whether the remote host is currently available. This determination may be made using different methods (e.g. pinging remote host, using an API call (IsAvailable( )), and the like). This determination may be made with more than one remote host. For example, while one remote host may be determined to be more available based on the load balancing factors, that remote host may not respond as being available. By making this available determination to more than one remote host at a time may save time in responding to the client with a remote host determination.

Flowing to operation 240, the determined remote host that is available is returned to the requesting client. According to an embodiment, the session manager determines the remote host without connecting the client to the remote host. Instead, the session manager provides the client with connection information such that the client may directly connect with the remote host without interference from the session manager. According to another embodiment, the session manager may establish a direct connection between the requesting client and the remote host.

Moving to operation 250, the client connects with the remote host using the determined remote host. According to an embodiment, if a remote host does not receive a connection from the client within a predetermined time (e.g. a 2, 3 minutes), the remote host automatically removes an ability of the client to connect.

The process then moves to an end block and returns to processing other actions.

FIG. 3 illustrates a process for monitoring a remote host and providing resource information to a session manager.

After a start operation, the process flows to operation 310, where the resource calculation may be tuned. According to an embodiment, the resource calculation may be tuned at runtime. For example, an administrator may change the resource calculation based on factors that they find relevant to their environments. The resource information sent to the session manager may also be configured. For example, the default average memory to use for the runtime processes when there are no running runtime processes may be set. The minimum memory available to start a new process may be set. A period of time to perform the resource calculation may be configured. The number of sessions that can be run on a remote host may be set. Other resource information configured to be sent to the session manager by the session monitor may include items such as: utilization rate, memory usage, and the like. Since each remote host has its own session monitor running, the remote host can be configured to run the session monitor if a piece of performance data threshold has been met (e.g. processor spiked for x amount of time, network utilization at x percentage for x amount of time, disk i/o utilization at x percentage for x amount of time, memory utilization at x percentage for x amount of time). Each of the pieces of resource information may be configured in the session manager and provided to the remote host for runtime modifications. The calculations may be done based on a running average and/or a point(s) in time. The resource calculation may be also tuned based on other factors. For example, certain tenants may use up more memory/run more processes than others. According to an embodiment, load balancing logic may adjust which remote host receives the next create session call based on the tenant and/or user selected.

Flowing to operation 320, a trigger to run the session monitor is determined. There are multiple ways that may trigger a session monitor to collect/determine resource information such as: when a session service starts; when the session manager starts; when a new session is created on a remote host; when a session is terminated; periodically; a spike event; and/or some other determined trigger.

According to an embodiment, when the session service starts on a remote host it triggers the session monitor on the remote host to run which reports the current state of all running sessions to the session manager. When the session manager starts it iterates each of the configured remote hosts and invokes a session monitor to run on each of them. Each time a session is created on a remote host, the session monitor runs and a call is made to the session manager to report the resource information including the session information. Once a termination of a process/session has occurred, the session monitor runs and a call is made to the session manager to report the sessions and resource information. Each session monitor may also run on a periodic basis (e.g. every 3 minutes, 5 minutes, 2 minutes, . . . ). The interval of when the session monitor should is run may be defined in the a configuration file.

Moving to operation 330, each session/process is queried on the remote host. According to an embodiment, each time the session monitor runs it queries the active runtime processes on the remote host and determines its current availability by performing a resource calculation.

Transitioning to operation 340, a resource calculation is performed by the remote host. When performing the resource calculation, each remote host performs its own calculations on the remote host to determine how many sessions it is able to create based on a number of factors (e.g. memory usage, processor usage, network usage, hard disk usage, tenant information, user information, and the like). One or more factors may be used in determining the number of sessions that the remote host is currently able to create. The session manager (as described) may modify/adjust the determined resource calculation for the remote host.

According to an embodiment, each runtime process that is executing on the remote host is determined. For each of the runtime processes different resource information is determined. This resource information may include an amount of memory used by each of the runtime processes and an overall memory usage. An average memory usage may also be determined by dividing the total memory used by the runtime processes by the number of runtime processes currently executing. According to an embodiment, when there are no running runtime processes, then a default memory usage may be used (e.g. 50 MB or some other value as determined by the application). This memory usage value may be used alone and/or in combination with other values to determine a number of sessions that the remote host is able to create.

Moving to decision operation 350, the resource information and resource calculation are sent to the session manager.

The process then moves to an end block and returns to processing other actions.

Figure 4:
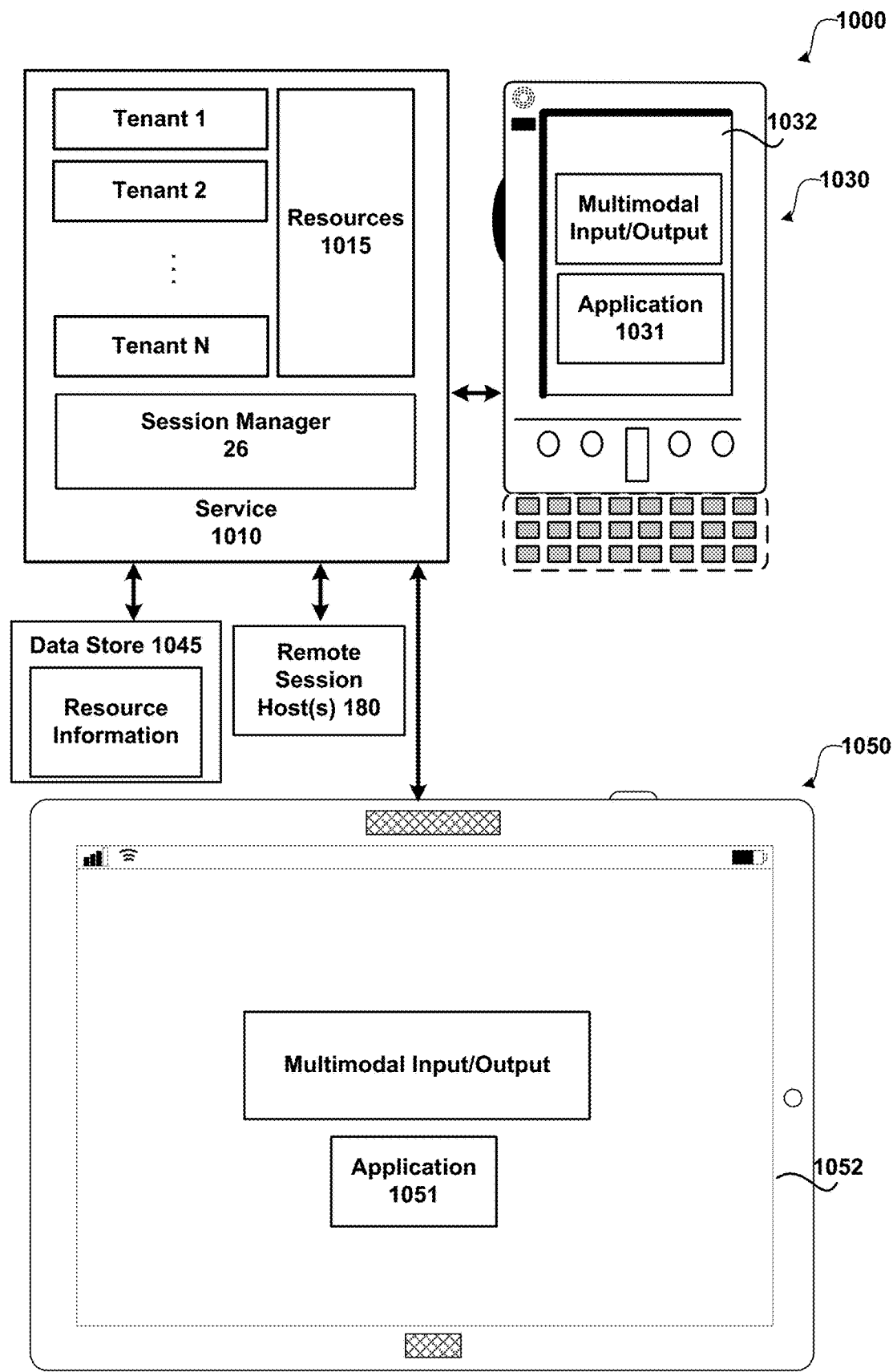
FIG. 4 illustrates an exemplary system for load balancing sessions using a session manager.

FIG. 4 illustrates an exemplary system for load balancing sessions using a session manager. As illustrated, system 1000 includes service 1010, session manager 26, data store 1045, remote session host(s) 180, resources 1015, touch screen input device/display 1050 (e.g. a slate) and smart phone 1030.

As illustrated, service 1010 provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data. For example, service 1010 may be a service providing business solutions, such as MICROSOFT DYNAMICS GP, and/or some other service. The session manager 26 stores and uses resource information obtained from remote hosts 180 to determine which remote host to associate with a session for a client.

As illustrated, service 1010 provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data. For example, service 1010 may be a service providing business solutions, such as MICROSOFT DYNAMICS GP, and/or some other service. The session manager 26 stores and uses resource information obtained from remote hosts 180 to determine which remote host to associate with a session for a client.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030 and touch screen input device/display 1050 are configured with multimodal applications (1031, 1051) that interact with service 1010 and sessions associated with the service.

As illustrated, touch screen input device/display 1050 and smart phone 1030 shows exemplary displays 1052/1032 showing the use of an application that utilize multimodal input/output (e.g. speech/graphical displays). Data may be stored on a device (e.g. smart phone 1030, slate 1050 and/or at some other location (e.g. network data store 1045). Data store 1054 may be used to store text used by a TTS component, corresponding human recordings of the text and/or models used by a language understanding system. The applications used by the devices may be client based applications, server based applications, cloud based applications and/or some combination.

Session manager 26 is configured to perform operations relating to methods/processes described herein. While manager 26 is shown within service 1010, the all/part of the functionality of the manager may be included in other locations (e.g. on smart phone 1030 and/or slate device 1050).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
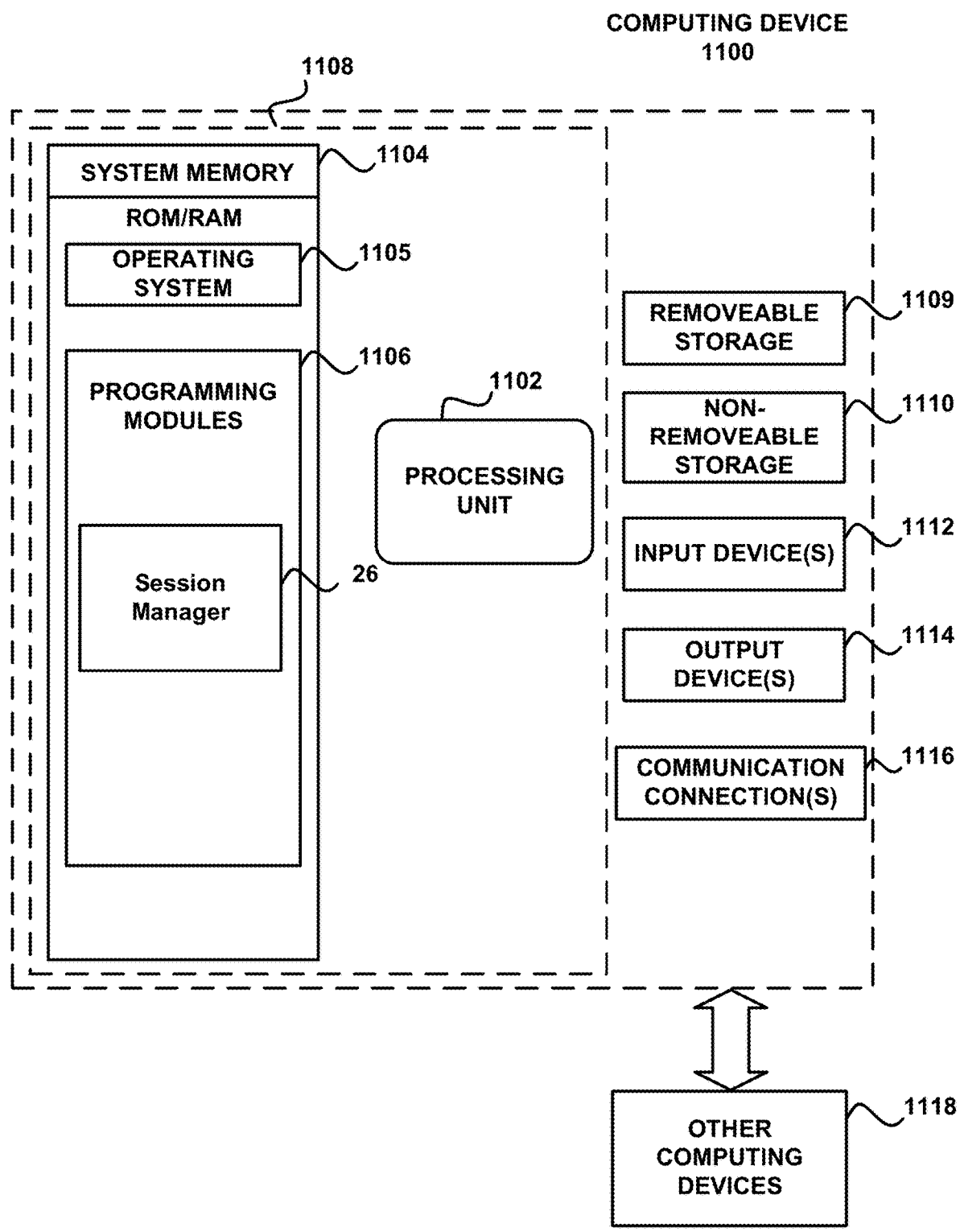
FIGS. 5, 6A, 6B, and 7 and the associated descriptions provide a discussion of a variety of operating environments in which embodiments of the invention may be practiced.
Figure 6A:
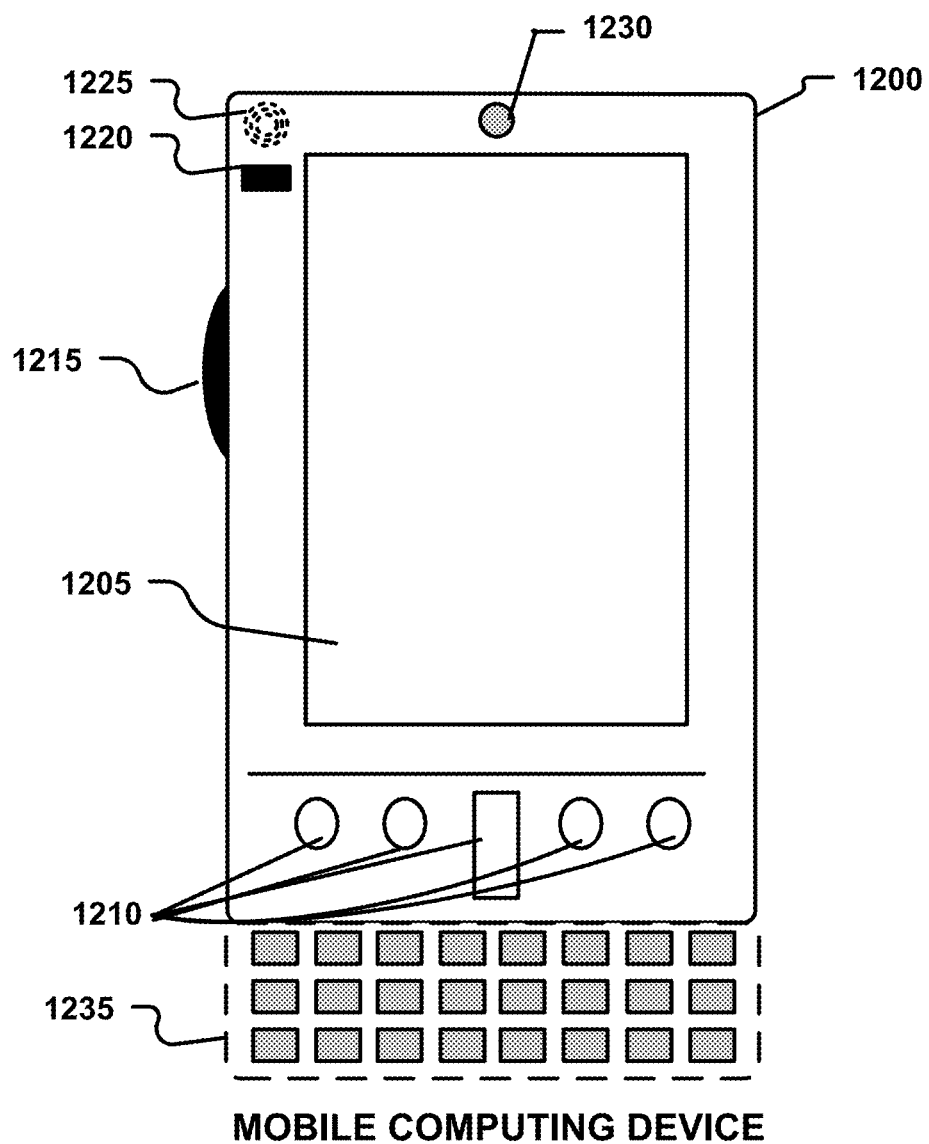
Figure 6B:
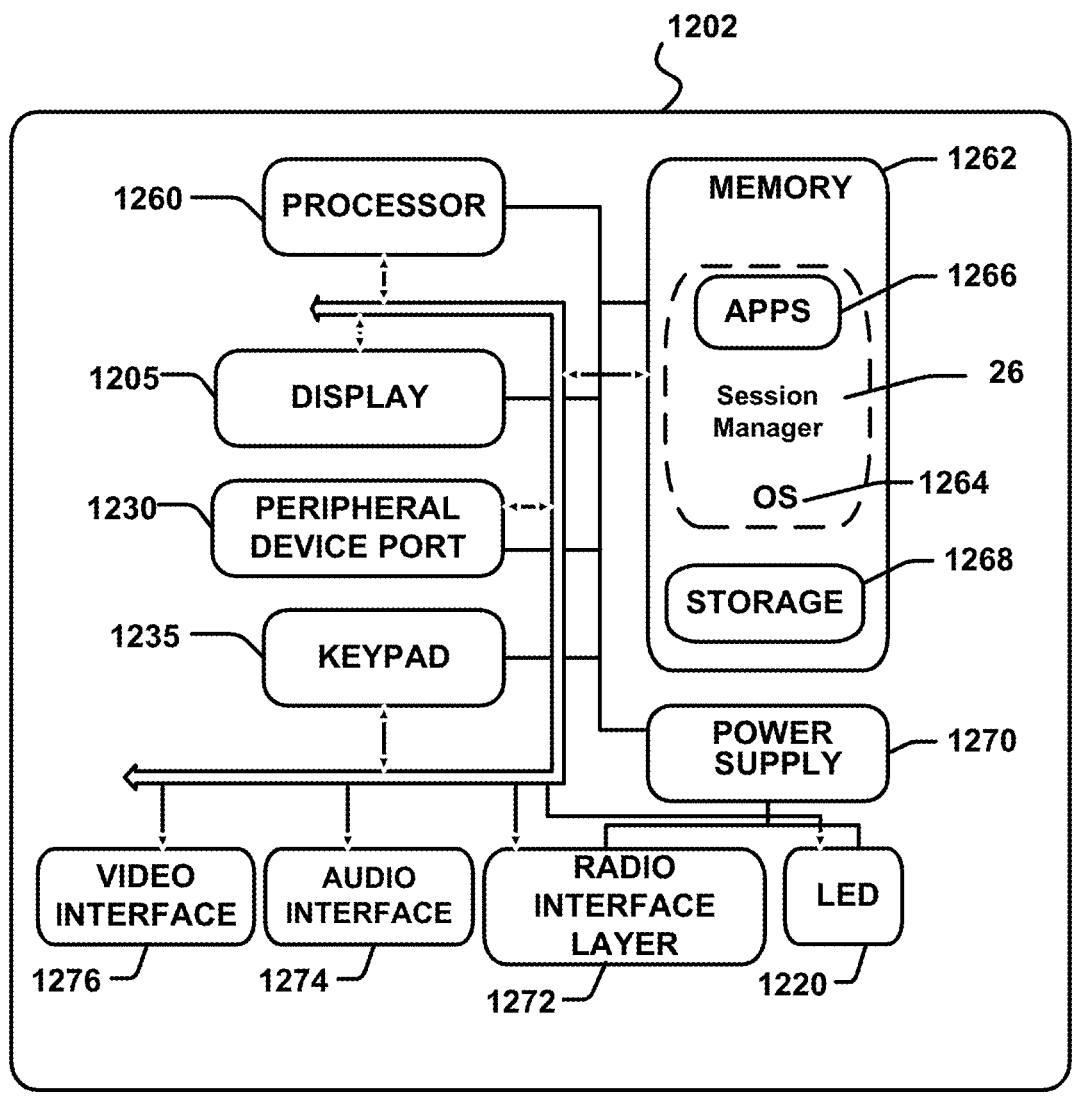
Figure 7:
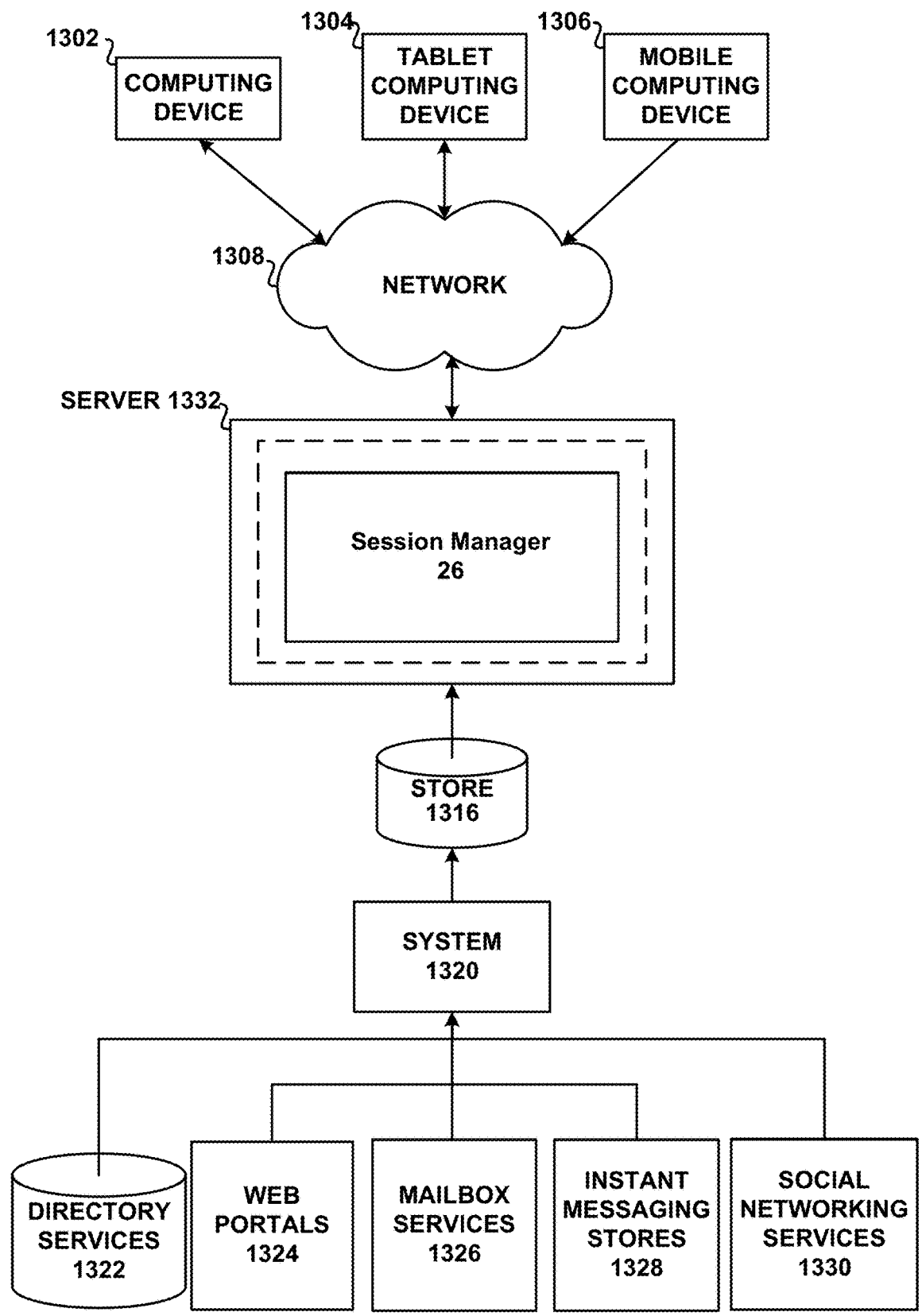

FIGS. 5, 6 and 7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a session manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 5 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a suitable mobile computing environment, for example, a mobile telephone, a smartphone, a tablet personal computer, a laptop computer, and the like, with which embodiments of the invention may be practiced. With reference to FIG. 6A, an example mobile computing device 1200 for implementing the embodiments is illustrated. In a basic configuration, mobile computing device 1200 is a handheld computer having both input elements and output elements. Input elements may include touch screen display 1205 and input buttons 1210 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1210. Mobile computing device 1200 may also include an optional keypad 1235. Optional keypad 1235 may be a physical keypad or a "soft" keypad generated on the touch screen display.

Mobile computing device 1200 incorporates output elements, such as display 1205, which can display a graphical user interface (GUI). Other output elements include speaker 1225 and LED 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 6B is a block diagram illustrating components of a mobile computing device used in one embodiment, such as the computing device shown in FIG. 6A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phone.

One or more application 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the session manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone to receive audible input, such as to facilitate a telephone conversation. In accordance with embodiments of the present invention, the microphone may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 6B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 7 illustrates a system architecture for a system as described herein.

Components managed via the session manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to methods as described herein. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   receiving first resource information from a first remote host, wherein the first resource information comprises a first calculation that has been performed by the first remote host;
   receiving second resource information from a second remote host, wherein the second resource information comprises a second calculation that has been performed by the second remote host, wherein the first remote host and the second remote host perform runtime alterations to the first calculation and the second calculation, respectively;
   aggregating at least the first resource information and the second resource information;
   forming aggregating information, at a processor, based on the aggregation of the at least the first resource information and the second resource information; and
   providing, to a client device, host information indicating the second remote host for a session, wherein the host information is based on determining the second remote host is for the session using at least the second calculation and user authentication information.

2. The method of claim 1, wherein the runtime alterations to the first calculation and the second calculation by the first remote host and the second remote host, respectively, are initiated by a session manager for the first remote host and the second remote host.

3. The method of claim 1, further comprising receiving updates to the aggregating information.

4. The method of claim 1, further comprising providing each of the first remote host and the second remote host with an update to the way a resource calculation is performed, wherein the update comprises an authorized user-tuned calculation technique.

5. The method of claim 1, further comprising determining a current availability of the determined second remote host before providing the host information to the client device.

6. The method of claim 1, further comprising reconnecting to a running process on the determined second remote host.

7. The method of claim 1, further comprising determining current sessions associated with a user and displaying the current sessions for selection.

8. The method of claim 1, further comprising receiving resource information from additional remote hosts, wherein each of the additional remote hosts determines available resources and performs another resource calculation.

9. The method of claim 1, wherein the first resource information is received in response to an event selected from a group consisting of a session created, a session terminated, a period of time expired, and an event that caused a spike in a use of available resources.

10. A non-transitory computer-readable storage medium having an executable stored thereon, which when executed instructs a processor to perform the method of claim 1.

11. A computer-readable device storing computer-executable instructions for determining a remote host, comprising:
    receiving first resource information from a first remote host, wherein the first resource information comprises a first calculation that has been performed by the first remote host;
    receiving second resource information from a second remote host, wherein the second resource information comprises a second calculation that has been performed by the second remote host, wherein the first remote host and the second remote host perform runtime alterations to the first calculation and the second calculation, respectively;
    aggregating at least the first resource information and the second resource information;
    forming aggregating information based on the aggregation of the at least the first resource information and the second resource information; and
    providing, to a client device, host information indicating the second remote host for a session, wherein the host information is based on determining the second remote host is for the session using at least the second calculation and user authentication information.

12. The computer-readable device of claim 11, wherein the runtime alterations to the first calculation and the second calculation by the first remote host and the second remote host, respectively, are initiated by a session manager for the first remote host and the second remote host.

13. The computer-readable device of claim 11, further comprising receiving updates to the aggregating information.

14. The computer-readable device of claim 11, further comprising providing each of the first remote host and the second remote host with an update to the way a resource calculation is performed, wherein the update comprises an authorized user-tuned calculation technique.

15. The computer-readable device of claim 11, further comprising determining a current availability of the determined second remote host before providing the host information to the client device.

16. The computer-readable device of claim 11, further comprising reconnecting to a running process on the determined second remote host.

17. The computer-readable device of claim 11, further comprising determining current sessions associated with a user and displaying the current sessions for selection.

18. The computer-readable device of claim 11, further comprising receiving resource information from additional remote hosts, wherein each of the additional remote hosts determines available resources and performs another resource calculation.

19. The computer-readable device of claim 11, wherein the first resource information is received in response to an event selected from a group consisting of a session created, a session terminated, a period of time expired, and an event that caused a spike in a use of available resources.

20. A system for determining a remote host, comprising:
   a processor; and
   a memory;
   a first remote host comprising a first session monitor to determine first resource information for the first remote host, wherein the first resource information is calculated by the first remote host performing a first resource calculation that calculates a first number of additional processes the first remote host can accommodate based at least in part on currently running processes on the first remote host;
   a second remote host comprising a second session monitor to determine second resource information for the second remote host, wherein the second resource information is calculated by the second remote host performing a second calculation that calculates a second number of additional processes the second remote host can accommodate based at least in part on currently running processes on the second remote host; and
   a session manager to perform actions, comprising:
      receiving first resource information from the first remote host and second resource information from a second remote host, wherein the first remote host and the second remote host perform runtime alterations to the first calculation and the second calculation, respectively;
      aggregating at least the first resource information and the second resource information;
      forming aggregating information based on the aggregation of the at least the first resource information and the second resource information; and
      providing, to a client device, host information indicating at least one of the first remote host and the second remote host will host a session, wherein the host information is based on a determination that the first remote host or the second remote host is for the session using at least user authentication information and the first calculation or the second calculation.

* * * * *